US012563556B2

(12) United States Patent
Deghel et al.

(10) Patent No.:     US 12,563,556 B2
(45) Date of Patent:        Feb. 24, 2026

(54) FIRST AND SECOND APPARATUS OF A RADIO COMMUNICATIONS NETWORK, METHODS TO OPERATE THE FIRST AND SECOND APPARATUS

(71) Applicant: Nokia Technologies Oy, Espoo (FI)

(72) Inventors: Matha Deghel, Paris (FR); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 631 days.

(21) Appl. No.: 17/998,300

(22) PCT Filed: Jun. 1, 2020

(86) PCT No.: PCT/EP2020/065105
§ 371 (c)(1),
(2) Date: Nov. 9, 2022

(87) PCT Pub. No.: WO2021/244725
PCT Pub. Date: Dec. 9, 2021

(65) Prior Publication Data
US 2023/0224905 A1      Jul. 13, 2023

(51) Int. Cl.
*H04W 72/21*          (2023.01)
*H04W 16/28*          (2009.01)
(Continued)

(52) U.S. Cl.
CPC ........... *H04W 72/21* (2023.01); *H04W 16/28* (2013.01); *H04W 72/53* (2023.01); *H04W 72/56* (2023.01)

(58) Field of Classification Search
CPC ..... H04W 72/21; H04W 72/53; H04W 72/56; H04W 16/28
See application file for complete search history.

(56) References Cited

U.S. PATENT DOCUMENTS

2011/0141928 A1      6/2011   Shin et al.
2017/0041118 A1*     2/2017   Liu ....................... H04L 1/0009
(Continued)

FOREIGN PATENT DOCUMENTS

CN          105391527 A       3/2016
CN          110892665 A       3/2020
(Continued)

OTHER PUBLICATIONS

"New WID: Further enhancements on MIMO for NR", 3GPP TSG RAN Meeting #86, RP-193133, Agenda Item: 9.1.1, Samsung, Dec. 9-12, 2019, 5 pages.
(Continued)

*Primary Examiner* — Yemane Mesfin
*Assistant Examiner* — Jia Hao Deng
(74) *Attorney, Agent, or Firm* — Lippes Mathias LLP

(57)          ABSTRACT

There is described a method to operate an apparatus of a radio communications network. The method comprises: receiving information characterizing at least one of a plurality of uplink handling rules; determining a plurality of uplink control information, wherein the determined uplink control information is associated with at least one uplink radio resource; selecting one of the plurality of uplink handling rules; mapping the plurality of determined uplink control information into an uplink control signal based on the selected uplink handling rule; and transmitting the uplink control signal via the at least one associated radio resource.

19 Claims, 3 Drawing Sheets

(51) Int. Cl.
    *H04W 72/53*    (2023.01)
    *H04W 72/56*    (2023.01)

(56)             References Cited

U.S. PATENT DOCUMENTS

| | | |
|---|---|---|
| 2017/0257884 A1 | 9/2017 | Rahman et al. |
| 2017/0303267 A1 | 10/2017 | Shin et al. |
| 2018/0198568 A1 | 7/2018 | Takeda et al. |
| 2019/0090258 A1 | 3/2019 | Ryu et al. |
| 2019/0097779 A1 | 3/2019 | Wu et al. |
| 2019/0306922 A1 | 10/2019 | Xiong et al. |
| 2019/0349918 A1 | 11/2019 | Nayeb Nazar et al. |
| 2019/0364561 A1 | 11/2019 | Xiong et al. |
| 2020/0008231 A1 | 1/2020 | Vilaipornsawai et al. |

FOREIGN PATENT DOCUMENTS

| | | |
|---|---|---|
| CN | 111052645 A | 4/2020 |
| CN | 111247825 A | 6/2020 |
| EP | 3567783 A1 | 11/2019 |
| WO | 2015/019181 A2 | 2/2015 |
| WO | 2018/144471 A1 | 8/2018 |
| WO | 2018/231728 A1 | 12/2018 |
| WO | 2019/138499 A1 | 7/2019 |
| WO | 2020/020815 A1 | 1/2020 |

OTHER PUBLICATIONS

"Multiple Transmission Reception Point Architecture in 5G", Computer Science, 2019, 5 pages.

Dahlman et al., "5G NR: the Next Generation Wireless Access Technology", Academic Press, Elsevier, 2018, 469 pages.

Invitation to Pay Additional Fees received for corresponding Patent Cooperation Treaty Application No. PCT/EP2020/065105, dated Feb. 9, 2021, 25 pages.

International Search Report and Written Opinion received for corresponding Patent Cooperation Treaty Application No. PCT/EP2020/065105, dated Mar. 30, 2021, 27 pages.

Office action received for corresponding Chinese Patent Application No. 202080101604.9, dated Apr. 26, 2024, 9 pages of office action and no page of translation available.

Office action received for corresponding Chinese Patent Application No. 202080101604.9, dated Sep. 7, 2024, 3 pages of office action and no page of translation available.

Notice of Allowance received for corresponding Chinese Patent Application No. 202080101604.9, dated Sep. 29, 2024, 4 pages of Notice of Allowance and no page of translation available.

Du et al., "An Improved Semi-blind Detection Algorithm for NR PUCCH", IEEE 5th International Conference on Computer and Communications (ICCC), Dec. 6-9, 2019, pp. 66-71.

Office action received for corresponding Indian Patent Application No. 202247076348, dated Feb. 21, 2023, 6 pages.

Office action received for corresponding Japanese Patent Application No. 2022-574143, dated Oct. 30, 2023, 2 pages of office action and 5 pages of summary and translation available.

Office Action received for corresponding Japanese Patent Application No. 2022-569006, dated Dec. 19, 2023, 4 pages of Office Action and 5 pages of summary and translation available.

"On multi-stage physical DL control", 3GPP TSG RAN1 WG Meeting #88, R1-1702224, Agenda item: 8.1.3.1.5, Intel Corporation, Feb. 13-18, 2017, pp. 1-2.

* cited by examiner

FIRST AND SECOND APPARATUS OF A RADIO COMMUNICATIONS NETWORK, METHODS TO OPERATE THE FIRST AND SECOND APPARATUS

RELATED APPLICATION

This application was originally filed as PCT Application No. PCT/EP2020/065105, filed on Jun. 1, 2020, which is incorporated herein by reference in its entirety.

FIELD OF THE INVENTION

Various example embodiments relate to enhancements for radio communications networks.

BACKGROUND

Uplink Control Information transmitted via the PUCCH comprises HARQ acknowledgements, Scheduling Requests and Channel State Information reports.

SUMMARY

A first aspect of the description is directed to an apparatus comprising at least one processor, at least one memory including computer program code, and at least one communication module, the at least one memory and computer program code configured, with the at least one processor, and the at least one communication module, to cause the apparatus at least to: receive information characterizing at least one of a plurality of uplink handling rules; determine a plurality of uplink control information, wherein the determined uplink control information (UCI) is associated with at least one uplink radio resource; select one of the plurality of uplink handling rules; map the plurality of determined uplink control information into an uplink control signal based on the selected uplink handling rule; and transmit the uplink control signal via the at least one associated radio resource.

According to the available plurality of uplink handling rules, a multi-level reliability control of PUCCH transmissions is established. Reliability and robustness of UCI multiplexed on PUCCH is increased. In particular, the proposed mechanisms allow to efficiently and dynamically control the rules of UCI multiplexing on PUCCH, including their related parameters, depending on the serving TRP/beam and related channel conditions. This results in good adaptability and control of reliability and robustness of UCIs multiplexed on PUCCH for multi-TRP and beam-based operations. Increasing the robustness of UCI transmissions improves the system performance on many levels since it implies better reliability for SR, HARQ-ACK, BFR request, and CSI.

According to an advantageous example, at least part of the plurality of uplink handling rules are associated with different spatial information, respectively. The apparatus is further configured to: select the one of the plurality of uplink handling rules in dependence on spatial information associated with the determined uplink control information.

For example, the spatial information, which indicates a UCI receiving entity, is mapped to a direction indicator, which indicates the two- or three-dimensional transmission direction for a radio beam. In another example, the spatial information is the direction indicator, which indicates the two- or three-dimensional transmission direction for the radio beam.

Advantageously, the destination/direction for the uplink control information transmission in the sense of the spatial information may be considered in order to exploit space diversity. By considering subsets of available uplink radio resources, radio resource space is exploited. In particular, multi-TRP scenarios benefit as, for example, a UE beam selection for the transmission can take place in order to increase the transmission quality. Since the UCI multiplexing is configured per TRP/beam, then this avoids overprovisioning resources for UCI transmissions on PUCCH on some of the beams or towards some of the TRPs, which results in better resource efficiency.

For example, HARQ-ACKs are responses to data received from a certain wireless entity, wherein the entity indicates the spatial information.

According to an advantageous example, the spatial information includes at least one of the following: a physical uplink control channel, PUCCH, spatial relation; an uplink/downlink transmission configuration indication, TCI; an uplink/downlink reference signal resource indicator, such as SRS resource indicator, SRI; a transmission-reception point, TRP, identifier like a CORESET Pool Index or like a CORESET Index; a user equipment panel identifier; and a spatial filter identifier.

According to an advantageous example, the at least one selected uplink handling rule comprises an uplink control information (UCI) multiplexing rule.

According to an advantageous example, at least one of the uplink handling rules comprises parameters related to at least one of the following: coding rate; disallowing or allowing multiplexing of types of uplink control information; priority order for types of uplink control information UCI; frequency hopping; DMRS configuration; modulation; and at least one of parameters included in at least one PUCCH format configuration.

According to an advantageous example, at least one of the uplink handling rules comprises at least one of the following: a set of a number of phase rotations for applying to a sequence; and a direction of an ordered set of phase rotations for applying to the uplink sequence.

By applying the set, for example in the sense of a sub-range of a range, to the uplink sequence, the apparatus is limited to the number of phase rotations when applying to the uplink sequence. Especially the lower bound/threshold of the range can be configured to the channel conditions. For example, for good channel conditions the lower bound can be low, whereas for bad channel conditions, the lower bound is raised.

By applying the direction, a diversity over time is generated. This diversity can be further exploited by introducing a priority of one direction over another.

According to an advantageous example, the apparatus is further configured to: map the plurality of determined uplink control information into the uplink control signal by applying a phase rotation to the uplink sequence within the set of the associated uplink handling rule and/or in the direction of the associated uplink handling rule.

Advantageously, this multiplexing ensures that the received multiplexed signal can be configured to the present channel state by applying a respective phase rotation to the uplink sequence.

According to an advantageous example, the apparatus is further configured to: receive a change request for changing at least one parameter of one of the plurality of uplink handling rules; change the at least one parameter.

Advantageously, the network is able to change the multiplexing rules in order to adapt to changing channel conditions. The changed parameter provides an ameliorated uplink control information transmission and reception.

According to an advantageous example, the apparatus is configured to: determine a channel state of an uplink channel for the transmission of the uplink control signal; and select one of the plurality of uplink handling rules in dependence on the determined channel state.

Advantageously, in downlink-heavy scenarios the apparatus may have better and timely knowledge of the channel conditions compared to the network.

According to an advantageous example, the apparatus is configured to: transmit the identity of the selected uplink handling rule.

Advantageously, the network is informed about the applied uplink handling rule. Effort on network premises to determine the selected uplink handling rule is reduced.

According to a second aspect of the description an apparatus is provided, the apparatus comprising at least one processor, at least one memory including computer program code, and at least one communication module, the at least one memory and computer program code configured, with the at least one processor, and the at least one communication module, to cause the apparatus at least to: determine information characterizing at least one of a plurality of uplink handling rules; transmit the information characterizing at least one of a plurality of uplink handling rules; receive an uplink control signal; and de-map the received uplink control signal into a plurality of uplink control information in dependence on one of the plurality of uplink handling rules.

According to the available plurality of uplink handling rules, a multi-level reliability control of PUCCH transmissions is established. Reliability and robustness of UCI multiplexed on PUCCH is increased. In particular, the proposed mechanisms allow to efficiently and dynamically control the rules of UCI multiplexing on PUCCH, including their related parameters, depending on the serving TRP/beam and related channel conditions. This results in good adaptability and control of reliability and robustness of UCIs multiplexed on PUCCH for multi-TRP and beam-based operations. Increasing the robustness of UCI transmissions improves the system performance on many levels since it implies better reliability for SR, HARQ-ACK, BFR request, and CSI.

According to an advantageous example, at least part of the plurality of uplink handling rules are associated with different spatial information, respectively.

Advantageously, the destination/direction in the sense of the spatial information for the uplink control information transmission is considered in order to exploit space diversity. By considering subsets of available uplink radio resources, radio resource space is exploited. Therefore, at least the spatial information is determined for at least a part of the plurality of uplink handling rules in order to be transmitted.

According to an advantageous example, at least one of the uplink handling rules comprises at least one of the following: a set of a number of phase rotations for applying to a sequence; and a direction of an ordered set of phase rotations for applying to the uplink sequence; and wherein the apparatus is configured to: determine the set and/or the direction in dependence on measured channel conditions.

By applying the set to the uplink sequence, the apparatus is limited to the number of shifts applying to the uplink sequence. Especially the lower bound/threshold of the range can be configured to the channel conditions. For example, for good channel conditions the lower bound can be low, whereas for bad channel conditions, the lower bound has to be raised.

According to an advantageous example, the apparatus is further configured to: transmit a change request for changing at least one parameter of one of the plurality of uplink handling rules.

Advantageously, the network is able to change the multiplexing rules in order to adapt to changing channel conditions. The changed parameter provides an ameliorated uplink control information transmission and reception.

According to an advantageous example, the apparatus is configured to: receive an identity of a selected uplink handling rule; and de-map the received uplink control signal into a plurality of uplink control information in dependence on the selected one of the plurality of uplink handling rules.

Advantageously, the network is informed about the applied uplink handling rule. Effort on network premises to determine the selected uplink handling rule may be reduced.

According to an advantageous example, the apparatus comprises a plurality of transmission-reception points.

DESCRIPTION OF THE EMBODIMENTS

Figure 1:
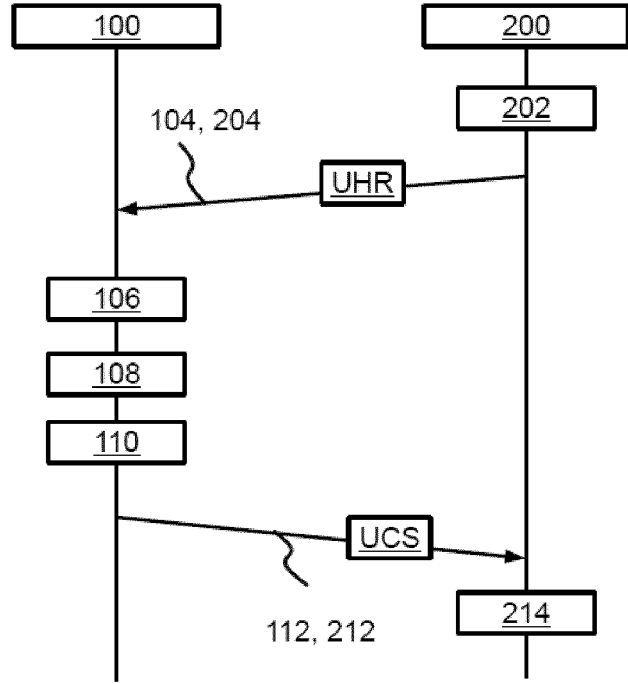
FIGS. 1 and 2 each depict a schematical sequence diagram.

FIG. 1 shows a first apparatus 100 and a second apparatus 200 of a radio communications network. According to an example, the first apparatus 100 is a user equipment, UE. The second apparatus 200 is a radio network infrastructure node. The second apparatus 200 comprises at least one transmission reception point, TRP.

According to a determining means or processing module 202, the second apparatus 200 configures a plurality of uplink handling rules UHR for example, in dependence on channel measurements or a configuration of a TRP network. According to the determining means or processing module 202, the second apparatus 200 configures the plurality of uplink handling rules UHR in dependence on a spatial information.

According to a transmitting means or transmission module 204, the second apparatus 200 signals the plurality of uplink handling rules UHR.

According to a receiving means or receiving module 104, the first apparatus 100 receives information characterizing at least one of a plurality of uplink handling rules UHR for overlapping PUCCHs carrying UCI. The uplink handling rules UHR can reside at least partly preconfigured on the first apparatus 100 and the second apparatus 200 is able to configure the uplink handling rules UHR by providing information characterizing at least one of, e.g. at least a part of, e.g. each one of the plurality of uplink handling rules UHR. The reception of the information characterizing at least one of the uplink handling rules UHR can take place via a single transmission or a plurality of transmissions, even from different TRPs.

For example, the information characterizing at least one of a plurality of uplink handling rules UHR comprises spatial information.

The spatial information may comprise a direction indicator e.g. of a dedicated beam and/or a destination indicator e.g. of a dedicated TRP. Examples of the spatial information comprise at least one of the following: a physical uplink control channel (PUCCH) spatial relation; an uplink/downlink transmission configuration indication (TCI); an uplink/downlink reference signal resource indicator, such as SRS resource indicator, SRI; a transmission-reception point (TRP) identifier, for example a CORESET Pool Index or a CORESET Index; a user equipment panel identifier; a spatial filter identifier.

Parameters of the uplink handling rules UHR comprise for example parameters that are related to at least one of the following: a coding rate e.g. maxCodeRate, disallowing or allowing multiplexing of types of uplink control information UCI e.g. simultaneous HARQ-ACK-CSI, prioritization or priority order of types of uplink control information UCI, frequency hopping e.g. interslotFrequencyHopping, DMRS configuration e.g. additionalDMRS, and/or modulation e.g. pi2BPSK, etc.

Types of uplink control information UCI comprise for example: ACK/NAKs, Scheduling Requests, CSI, etc.

According to an example, disallowing or allowing multiplexing of types of uplink control information UCI comprises that a first type of UCI is allowed to be multiplexed, wherein a second type of UCI is not allowed to be multiplexed with other uplink control information UCI.

According to an example, a priority order of types of uplink control information UCI comprises that a first type of UCI is preferred over a second type of UCI. Accordingly, if a first UCI of the first type and a second UCI of the second type are determined, and if the associated at least one radio resource for uplink transmission overlap, then the first UCI is transmitted and at least part of the second UCI is dropped.

According to an example, rules for grouping of bits are defined so that the configured/indicated coding rate is not exceeded. The parameters of or associated with the uplink handling UHR rules may comprise parameters associated with the pre-defined PUCCH formats. Therefore, the uplink handling rule UHR comprises parameters associated with the handling of uplink control information UCI.

Of course, two uplink handling rules are considered different already in a value of a related parameter. For example, two uplink multiplexing rules may be the substantially same except that the value of maxCodeRate (of a substantially same PUCCH Format) differs between the two rules.

According to a determining means or processing module 106, the first apparatus 100 determines a plurality of uplink control information UCI. The uplink control information UCI may comprise at least one of the following: HARQ-ACK, SR, BFR requests, CSI. The uplink control information UCI is associated with at least one uplink radio resource.

At least a part of the determined plurality of uplink control information UCI, for example HARQ-ACKs, are associated with the spatial information for selecting the uplink handling rule UHR. In case partial or even full dropping of UCI is needed, the uplink handling rule to decide which UCI content should be dropped is configured to be dependent on whether the UCI is related/intended to a TRP that is different from the TRP towards which the multiplexed UCIs will be transmitted. For instance, in case dropping needs to be done when applying a UCI multiplexing rule associated with one TRP towards which the multiplexed-UCI transmission will be performed, and some of the UCIs are intended to another TRP, then the UE could be configured to drop UCI content related to the latter i.e. other TRP.

According to a selecting means or processing module 108, the first apparatus 100 selects one of the plurality of uplink handling rules UHR. For example, the uplink handling rules depend on the type and number of the plurality of uplink control information UCI to be transmitted via a dedicated PUCCH resource.

According to an example, at least part of the plurality of uplink handling rules UHR are associated with different spatial information, respectively. The selecting means or processing module 108 selects one of the plurality of uplink handling rules UHR in dependence on the spatial information of the determined uplink control information UCI.

The association between uplink control information UCI and the spatial information may be provided via the uplink radio resource, such a PUCCH resource, which is scheduled/configured to carry the UCI. In other words, the uplink radio resource, that e.g. has been scheduled, has spatial information (e.g. PUCCH spatial relation) provided by the network in the sense of the second apparatus 200.

For example, the spatial information is transmitted to the apparatus 100, for example, via DCI or MAC CE, provided by the apparatus 200. Upon determining the uplink control information UCI and the associated at least one uplink resource, the spatial information is available at the first apparatus 100. Therefore, the spatial information is associated with the determined uplink control information UCI. For example, the association between the spatial information and the determined uplink control information UCI is done through/provided by the PUCCH resource which is configured/scheduled to carry the UCI.

According to a mapping means or processing module 110, the first apparatus 100 maps or multiplexes the plurality of determined uplink control information UCI into an uplink control signal UCS, which is to be transmitted on the dedicated PUCCH resource, in dependence on the selected uplink handling rule UHR.

The mapping according to the handling rule comprises dropping and/or grouping of bits in order to maintain the configured distance of phase rotation between two points, in the phase rotation constellation. Therefore, the distance is kept greater than or equal to a configured phase-rotation threshold.

According to a selecting means or processing module 108, the first apparatus 100 selects the one of the plurality of uplink handling rules UHR in dependence (i.e. based) on the spatial information. For example, the network, in particular the second apparatus 200, configures the UE with at least one uplink handling rule, which comprises parameters for multiplexing the uplink information for transmission, per spatial information. The spatial information indicates at least one of the following: a TRP; a group of TRPs, a beam of the UE, a group of beams of the UE. Thus, the uplink handling rules and its related parameters may differ from a one TRP/beam to another. In an example, a plurality of UE beams are mapped to a respective TRP. Therefore, for example, the mapping of the UCI to a certain UE beam is done via the spatial information.

According to an example, the at least one uplink handling rule is configured and selectable per subset of PUCCH resources associated with one or multiple TRPs. In this case, the PUCCH resource associated with one or multiple TRPs represents the spatial information.

In another example, when at least one UE beam, from a configured group of beams, is configured to be used for PUCCH transmission, then the uplink handling rule associated to that beam via the spatial information is considered activated and is used for that transmission of uplink control information UCI.

According to a transmitting means or transmission module 112, the first apparatus 100 transmits the uplink control signal UCS via the dedicated PUCCH resources towards the second apparatus 200 or towards one of the TRPs of the second apparatus 200.

According to a receiving means or reception module 212, the second apparatus 200 receives an uplink control signal UCS.

According to a de-mapping means or processing module 214, the second apparatus 200 de-maps or de-multiplexes the received uplink control signal UCS into a plurality of uplink control information UCI in dependence on one of the plurality of uplink handling rules UHR.

Figure 2:
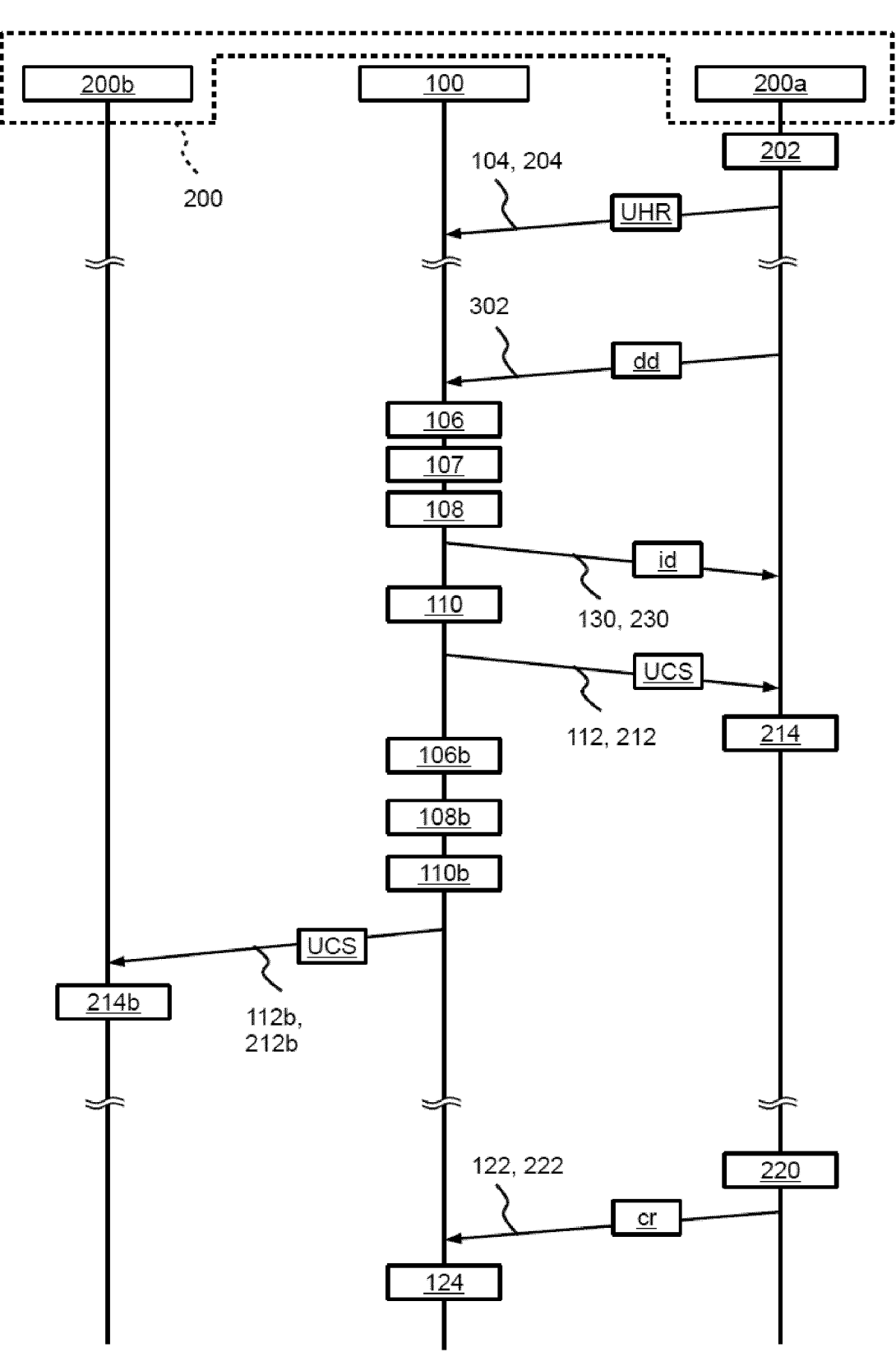

FIG. 2 depicts a sequence diagram with the first apparatus 100 and the second apparatus 200. The second apparatus 200 comprises two transmission reception points TRPs 200a, 200b. Reference is made to FIG. 1. The second apparatus 200 further comprises and/or represents a gNB.

In this example, the two serving TRPs 200a, 200b are configured with different uplink handling rules for their corresponding PUCCH transmissions. The network comprising the TRPs 200a, 200b dynamically adapts/controls the uplink handling rule per TRP depending on the relative changes in channel conditions. The apparatus 200 configures via higher layers the first apparatus 100, the UE, with different uplink handling rules for the two TRPs 200a, 200b. In other words, the uplink handling rules are TRP specific. When the first apparatus 100, the UE, has to multiplex UCI on PUCCH associated with TRP 200a, the apparatus 100 applies the uplink handling rule associated with TRP 200a. Then, it performs the UCI transmission towards TRP 200a.

On the other hand, if the UE has to multiplex UCI on PUCCH associated with TRP 200b, the UE applies the uplink handling rule associated with TRP 200b. Then, the first apparatus 100, the UE, performs the UCI transmission towards TRP 200b. Reference is made to the reference signs 106, 108, 110, 112, 212, and 214 with appendix 'b', wherein the corresponding description with respect to reference signs 106, 108, 110, 112, 212, 214 applies.

According to the determining means or processing module 202, 220, the second apparatus 200 determines and/or configures the set and/or the direction in dependence on measured channel conditions for example between the TRP and the UE.

According to the receiving means or reception module 104, the first apparatus 100 is configured with at least one uplink handling rule UHR per TRP 200a, 200b.

According to transmission means or transmission module 302, the first apparatus 100 receives downlink data dd, for which the first apparatus 100 generates HARQ-ACKs. These HARQ-ACKs represent UCI determined in determining means or processing module 106.

According to determining means or processing module 106, the first apparatus 100 has to multiplex UCI on PUCCH associated with TRP 200a. According to determining means or processing module 110, the first apparatus 100 applies the uplink handling rule UHR associated with the TRP 200a.

According to a determining means or processing module 107, the first apparatus 100 determines a channel state of an uplink channel for the transmission of the uplink control signal UCS. According to a selecting means or processing module 108, the first apparatus 100 selects one of the plurality of uplink handling rules UHR in dependence on the plurality of uplink control information UCI and in dependence on the determined channel state. So, when the network, for example the second apparatus 200, configures the UE with more than one uplink handling rule, for example a UCI multiplexing rule, which includes prioritization, the UE can be allowed to pick the most suitable uplink handling rule, including multiplexing parameters and related parameters, based on the channel conditions. An uplink handling rule for a UE could be common among the TRPs/beams or could be configured per TRP/beam or group of TRPs/beams. Indeed, under some scenarios such as downlink-heavy scenarios, the UE may have better and timely knowledge of the channel conditions compared to the network. The UE may inform the network about the selected UCI multiplexing rule, including related parameters, through some dedicated UCI; or even via MAC CE.

According to a transmitting means or transmission module 130, the first apparatus 100 transmits the identity id of the selected uplink handling rule UHR. According to receiving means or reception module 230, the TRP 200a receives the identity of a selected uplink handling rule UHR.

According to transmission means or transmission module 112, the corresponding uplink control signal UCS is transmitted towards the TRP 200a.

According to de-mapping means or processing module 214, the TRP 200a de-maps or de-multiplexes the received uplink control signal UCS into a plurality of uplink control information UCI in dependence on the selected one of the plurality of uplink handling rules UHR.

According to an example, the UE is configured to not inform the network about the selected UCI multiplexing rule, in which case the network relies on multiple hypotheses regarding the different configured uplink handling rule in order to receive the UCI transmission.

According to an example, in forward-looking scenarios, the second apparatus 200 decides to configure at least one PUCCH resource to be common for a plurality of/a group of TRPs 200a and 200b. In this case, if TRP 200a and 200b are configured with a separate uplink handling rule, then if the UE has UCIs to multiplex on such a resource, the UE could be configured to use e.g. the uplink handling rule UHR that may result in higher reliability. For instance, lower max coding-rate, greater phase-rotation threshold, or greater Tx power, could be used as conditions for selecting the respective uplink handling rule UHR.

Due to e.g. sudden changes in the channel conditions for TRP 200a, the second apparatus 200 decides to dynamically update the uplink handling rule for TRP 200a. According to a determining means or processing module 220, the second apparatus 200 determines a change request cr in order to request the update for the UE. According to transmission means or transmission module 222, the second apparatus 200 transmits a change request cr for changing at least one parameter of one of the plurality of uplink handling rules UHR. This update can be e.g. done through DCI or MAC CE. Some of the parameters that could be updated: threshold related to phase rotation or equivalently related to cyclic shift, maximum coding rate, simultaneous HARQ-ACK-CSI.

According to a receiving means or receiving module 122, the first apparatus 100 receives the change request cr for changing at least one parameter of one of the plurality of uplink handling rules. According to a changing means or processing module, the first apparatus 100 changes the at least one parameter. Via the change request, the network is able to dynamically and explicitly change/adapt at least one handling rule, for example through MAC CE and/or Downlink Control Information, DCI. This allows the network to dynamically control UCI multiplexing at least per TRP/beam or group of TRP/beams.

In the following, a cyclic shift operation/phase rotation operation configured via the uplink handling rules is exemplified.

After applying a certain phase rotation/cyclic shift, the shifted sequence is transmitted towards the second apparatus 200, in particular towards at least one TRP. In an example, the uplink handling rules UHR comprise at least a direction of phase rotations/cyclic shifts for applying to the uplink sequence.

According to an example of the direction of phase rotations/cyclic shifts, for example UCI transmissions on PUCCH Format 0, the network configures the UE with at least two different phase rotation constellations in form of two different uplink handling rules. At least a part of one constellation, a first uplink handling rule, is be shifted clockwise or counterclockwise by a certain offset compared to another constellation, a second uplink handling rule. For example, the different constellations are used across symbols of the PUCCH Format 0 transmission and/or across PUCCH Format 0 repetitions/transmissions on different beams and/or towards different TRPs.

According to the mapping means or processing module 110, the first apparatus 100 maps the plurality of determined uplink control information UCI into the uplink control signal UCS by applying a phase rotation to the uplink sequence within the set of the associated uplink handling rule UHR and/or in the direction of the associated uplink handling rule UHR.

Applying the phase rotation/cyclic shift for UCI multiplexing/transmission is advantageous for example on PUCCH Format 0. In other words, the associated uplink handling rule comprises a definition of a threshold related to phase rotation, or equivalently related to cyclic shift. For UCI multiplexing on PUCCH Format 0, the UE will take care that a phase rotation between two points, in the phase rotation constellation, is not lower than the defined threshold. In an example, the network may configure a single phase-rotation threshold that is common for the TRPs and beams.

For example, for the plurality of TRPs 200a, 200b a different phase rotation threshold/a different phase rotation threshold is configured, e.g. depending on the corresponding delay spread profile. The different cyclic shift threshold represents the former set of the possible range of the number of phase rotations.

A first threshold is equal to 2*Pi/12 and is configured via determining means or processing module 202 as the uplink handling rule for TRP 200a. A second threshold is equal to 2*Pi/6 and is configured via determining means or processing module 202 for TRP 200b. For the multiplexed-UCI transmission on PUCCH Format 0, e.g. towards TRP 200b, the lower bound of phase rotation between two points, in the phase rotation constellation, should not be lower than 2*Pi/6. Hence, the first apparatus 100 cannot multiplex two HARQ-ACK bits+SR on PUCCH Format 0 associated with TRP 200b, and some dropping or grouping of bits would be needed in this case. In the example here the second apparatus 200 configures e.g. via higher layers the first apparatus 100 with different uplink handling rules e.g. comprising the phase rotation threshold, for the two TRPs 200a, 200b. Put differently, the uplink handling rules UHR are TRP-specific.

When the first apparatus 100 has to multiplex two HARQ-ACK bits+SR on PUCCH Format 0 associated with TRP 200a, the first apparatus 100 applies the uplink handling rule associated with TRP 200a in processing module 110. Since here the first threshold equals 2*Pi/12, thus the two HARQ-ACK bits and SR are multiplexed and transmitted towards TRP 200a. This is because, in this case, the lower bound for the phase rotation between two points, in the phase rotation constellation, will not be lower than the first threshold.

On the other hand, if the first apparatus 100, the UE, has to multiplex two HARQ-ACK bits+SR on PUCCH Format 0 associated with TRP 200b, the first apparatus 100 applies the uplink handling rule associated with TRP 200b. Since the second threshold equals 2*Pi/6, thus the two HARQ-ACK bits and SR could not be multiplexed together, because otherwise the lower bound phase rotation between two points, in the phase rotation constellation, will be lower than the second threshold. Hence, dropping rules are configured via the corresponding uplink handling rule UHR to be used in such a case, where for instance one HARQ-ACK bit could be dropped. In an example, a grouping rule is configured via the associated uplink handling rule to be used for such a case, where e.g. the HARQ-ACK bits are grouped into one HARQ-ACK bit. The first apparatus 100, the UE, then multiplexes the resulting UCI e.g. one HARQ-ACK bit+SR and transmits the corresponding PUCCH towards TRP 200b.

According to an example, dropping is adopted in the former example for the UCI to be transmitted towards TRP 200b. The uplink handling rule to decide which UCI content should be dropped is configured to be dependent on whether the UCI is related/intended to a TRP that is different from the TRP towards which the multiplexed UCI will be transmitted. For the above example, let's assume that among the two HARQ-ACK bits+SR to be transmitted towards TRP 200b, one HARQ-ACK bit is intended to TRP 200a, and the remaining part is intended to TRP 200b. Therefore, in this case, the HARQ-ACK bit intended to TRP 200a is dropped, and the UE multiplexes the SR with the other HARQ-ACK bit.

According to an example, if the UCI multiplexing should be done on a PUCCH resource which is allowed to be common for TRP 200a and TRP 200b, then the second threshold, which is the phase-rotation threshold for TRP 200b, is used since e.g. second threshold>first threshold. According to an example, the selection of the applied uplink handling rule is dependent on which uplink handling rule can result in higher UCI load to be transmitted.

According to an example, the network, for example the second apparatus 200, dynamically indicates/updates, via the transmission means or transmission module 222, the at least one phase-rotation threshold or the set as part of one of the uplink handling rules through MAC CE and/or Downlink Control Information DCI.

Figure 3:
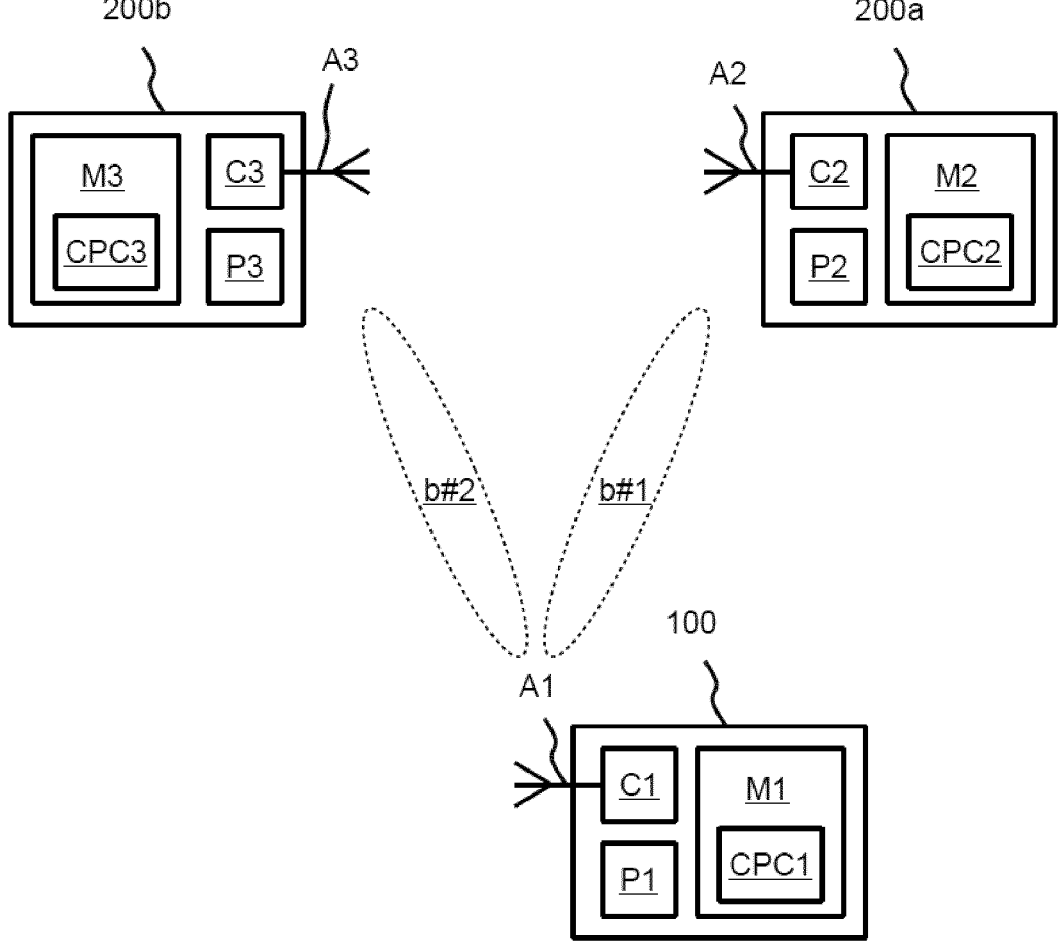
FIG. 3 depicts schematically a radio communications network.

FIG. 3 depicts a radio communications network RCN comprising the first apparatus 100, the UE, and the TRPs 200a and 200b. The first apparatus 100 is configured to provide at least two beams b #1 and b #2 in order to transmit the uplink control information in dependence on the uplink handling rule on one or both of the radio beams b #1, b #2.

The first radio device 100 comprises at least one processor P1, at least one memory M1 including computer program code CPC1, and at least one communication module C1 that is coupled with at least one antenna A1. The at least one memory M1 and computer program code CPC1 are configured, with the at least one processor P1, and the at least one communication module or communication means C1, to cause the first radio device 100 at least to operate according to the present description.

The TRP 200a, 200b comprises at least one processor P2, P3, at least one memory M2, M3 including computer program code CPC2, CPC3, and at least one communication module or communication means C2, C3 that is coupled with at least one antenna A2, A3. The at least one memory M2, M3 and computer program code CPC2, CPC3 are configured, with the at least one processor P2, P3, and the at least one communication module C2, C3, to cause the TRP 200a, 200b at least to operate according to the present description. The first radio device 100 transmits signals in an uplink direction to the TRPs 200a, 200b. The TRPs 200a, 200b transmit signals in a direction to the first radio device 100.

Certain abbreviations that may be found in the description and/or in the figures are herewith defined as follows:
5G 5$^{th}$ Generation
BFR Beam Failure Recovery
BM Beam Management
BPSK Binary Phase Shift Keying
CSI Channel State Information
CORESET Control Resource Set
DCI Downlink Control Information
DL Downlink
DMRS Demodulation Reference Signal
gNB 5G/NR base station
HARQ Hybrid Automatic Repeat Request
HARQ-ACK Hybrid Automatic Repeat Request Acknowledgement
MAC Medium Access Control
MAC CE MAC Control Element
NR New Radio
PDCCH Physical Downlink Control Channel
PUCCH Physical Uplink Control Channel
RAN Radio Access Network
RX Reception
SINR Signal-to-Noise-plus-Interference Ratio
SR Scheduling Request
SRS Sounding Reference Signal
TRP Transmission Reception Point
TX Transmission
UCI Uplink Control Information
UE User Equipment
UL Uplink Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising: at least one processor, at least one memory including computer program code, and at least one communication module, the at least one memory and computer program code configured, with the at least one processor, and the at least one communication module, to cause the apparatus at least to:
    Receive information characterizing at least one of a plurality of uplink handling rules (UHR);
    Determine a plurality of uplink control information (UCI), the plurality of UCI comprising at least two different types of UCI selected from: Hybrid Automatic Repeat Request acknowledgements (HARQ-ACK), Scheduling Requests (SR), Beam Failure Recovery (BFR) requests, and Channel State Information (CSI), wherein the plurality of determined UCI is associated with at least one uplink radio resource;

12

Select one of the plurality of uplink handling rules (UHR), wherein at least part of the plurality of UHR are associated with different spatial information, and the selecting is in dependence on spatial information associated with the plurality of determined UCI;
    Map the plurality of determined UCI into an uplink control signal (UCS) based on the selected UHR; and
    Transmit the UCS via the at least one associated radio resource.

2. The apparatus according to claim 1, wherein the mapping comprises applying a phase rotation or cyclic shift to the uplink sequence, the phase rotation being determined according to the selected uplink handling rule (UHR) and the at least one memory and computer program code are further configured, with the at least one processor, and the at least one communication module, to cause the apparatus at least to:
    transmit an identity of the selected uplink handling rule (UHR) to a network node.

3. The apparatus according to claim 2, wherein the spatial information includes at least the following:
    a physical uplink control channel (PUCCH) spatial relation;
    an uplink/downlink transmission configuration indication (TCI);
    an uplink/downlink reference signal resource indicator;
    a transmission-reception point (TRP) identifier;
    a user equipment panel identifier; and
    a spatial filter identifier.

4. The apparatus according to claim 1, wherein at least the uplink handling rules (UHR) indicates an uplink control information (UCI) multiplexing rule, and wherein the mapping comprises multiplexing the plurality of determined uplink control information (UCI) to the uplink control signal (UCS) based on the multiplexing rule indicated by the selected uplink handling rule (UHR).

5. The apparatus according to claim 1, wherein at least the plurality of uplink handling rules (UHR) comprises parameters related to at least the following:
    coding rate;
    disallowing or allowing multiplexing of types of uplink control information (UCI); priority order of types of uplink control information (UCI);
    frequency hopping;
    Demodulation Reference Signal configuration;
    modulation; and
    at least one of parameters included in at least one Physical Uplink Control Channel format configuration.

6. An apparatus comprising: at least one processor, at least one memory including computer program code, and at least one communication module, the at least one memory and computer program code configured, with the at least one processor, and the at least one communication module, to cause the apparatus at least to:
    Determine information charactering at least one of a plurality of uplink handling rules (UHR);
    Transmit the information characterizing at least one of a plurality of uplink handling rules (UHR), wherein at least part of the plurality of UHR are associated with different spatial information, respectively;
    Receive an uplink control signal (UCS); and
    De-map the received UCS into a plurality of uplink control information (UCI) in dependence on one of the plurality of UHR, the plurality of UCI comprising at least two different types of UCI selected from: Hybrid Automatic Repeat Request acknowledgements

13

14

(HARQ-ACK), scheduling Requests (SR), Beam Failure Recovery (BFR) requests, and Channel State Information (CSI).

7. The apparatus according to claim 6, wherein at least the uplink handling rules (UHR) comprises at least the following:

a set of a number of phase rotations for applying to a sequence; and a direction of an ordered set of phase rotations for applying to the uplink sequence; and wherein the apparatus is configured to:

determine the sub-range and the direction in dependence on measured channel conditions.

8. The apparatus according to claim 6 further configured to:

transmit a change request (cr) for changing at least one parameter of the plurality of uplink handling rules (UHR).

9. The apparatus according to claim 6, wherein the apparatus is configured to:

receive an identity of a selected uplink handling rule (UHR); and de-map the received uplink control signal (UCS) into a plurality of uplink control information (UCI) based on the selected one of the plurality of uplink handling rules (UHR).

10. A method to operate an apparatus comprising:

Receiving information characterizing at least one of a plurality of uplink handling rules (UHR);

Determining a plurality of uplink control information (UCI), the plurality of UCI comprising at least two different types of UCI selected from: Hybrid Automatic Repeat Request acknowledgements (HARQ-ACK), Scheduling Requests (SR), Beam Failure Recovery (BFR) requests, and Channel State Information (CSI), wherein the plurality of determined UCI is associated with at least one uplink radio resource;

Selecting one of the plurality of UHR, wherein at least part of the plurality of UHR are associated with different spatial information, and the selecting is in dependence on spatial information associated with the plurality of determined UCI;

Mapping the plurality of determined UCI into an uplink control signal (UCS) based on the selected UHR; and Transmitting the UCS via the at least one associated radio resource.

11. The method according to claim 10, wherein the mapping comprises applying a phase rotation or cyclic shift to the uplink sequence, the phase rotation being determined according to the selected uplink handling rule (UHR) and the method further comprises:

transmitting an identity of the selected uplink handling rule (UHR) to a network node.

12. The method according to claim 11, wherein the spatial information includes at least the following:

a physical uplink control channel (PUCCH) spatial relation;

an uplink/downlink transmission configuration indication (TCI);

an uplink/downlink reference signal resource indicator;

a transmission-reception point (TRP) identifier;

a user equipment panel identifier; and a spatial filter identifier.

13. The method according to claim 10, wherein at least one of the uplink handling rules (UHR) indicates an uplink control information (UCI) multiplexing rule, and wherein the mapping comprises multiplexing the plurality of determined uplink control information (UCI) to the uplink control signal (UCS) based on the multiplexing rule indicated by the selected uplink handling rule (UHR).

14. The method according to claim 10, wherein at least the uplink handling rules (UHR) comprises parameters related to at least the following:

coding rate;

disallowing or allowing multiplexing of types of uplink control information (UCI);

priority order of types of uplink control information (UCI);

frequency hopping;

Demodulation Reference Signal configuration;

modulation; and at least one of parameters included in at least one Physical Uplink Control Channel format configuration.

15. A method to operate an apparatus comprising:

Determining information characterizing at least one of a plurality of uplink handling rules (UHR);

Transmitting the information characterizing at least one of a plurality of UHR;

Receiving an uplink control signal (UCS); and

De-mapping the received UCS into a plurality of uplink control information (UCI) in dependence on one of a plurality of UHR.

16. The method according to claim 15, wherein at least part of the plurality of uplink handling rules (UHR) are associated with different spatial information, respectively.

17. The method according to claim 15, wherein at least the uplink handling rules (UHR) comprises at least the following:

a set of a number of phase rotations for applying to a sequence; and a direction of an ordered set of phase rotations for applying to the uplink sequence; and the method further comprising:

determining the sub-range and/or the direction in dependence on measured channel conditions.

18. The method according to claim 15 further comprising:

transmitting a change request (cr) for changing at least one parameter of the plurality of uplink handling rules (UHR).

19. The method according to claim 15 further comprising:

receiving an identity of a selected uplink handling rule (UHR); and de-mapping the received uplink control signal (UCS) into a plurality of uplink control information (UCI) based on the selected the plurality of uplink handling rules (UHR).

* * * * *